United States Patent
Cippitani

(10) Patent No.: US 8,146,575 B2
(45) Date of Patent: Apr. 3, 2012

(54) SYSTEM FOR SUPPLY OF LPG, METHANE, AMMONIA, AND GAS IN GENERAL FOR PETROL OR DIESEL ENGINES WITH ELECTRONIC PRESSURE REGULATOR FOR CONTINUOUS VARIATION OF THE PRESSURE OF THE FUEL SUPPLIED TO THE INJECTORS

(75) Inventor: Luciano Cippitani, Nettuno (IT)

(73) Assignee: ICOMET SpA, Latina (IT)

( * ) Notice: Subject to any disclaimer, the term of this patent is extended or adjusted under 35 U.S.C. 154(b) by 365 days.

(21) Appl. No.: 12/526,212

(22) PCT Filed: Dec. 18, 2008

(86) PCT No.: PCT/IT2008/000775
§ 371 (c)(1),
(2), (4) Date: Aug. 6, 2009

(87) PCT Pub. No.: WO2009/081441
PCT Pub. Date: Jul. 2, 2009

(65) Prior Publication Data
US 2010/0010727 A1    Jan. 14, 2010

(30) Foreign Application Priority Data
Dec. 20, 2007   (IT) .............................. RM2007A0664

(51) Int. Cl.
*F02B 13/00*    (2006.01)
(52) U.S. Cl. ........................................ 123/575; 123/1 A
(58) Field of Classification Search .......... 701/103–105, 701/114, 115; 123/1 A, 434, 436, 41.31, 123/478, 480, 575–578
See application file for complete search history.

(56) References Cited

U.S. PATENT DOCUMENTS
4,502,453 A    3/1985 Kabasin et al.
(Continued)

FOREIGN PATENT DOCUMENTS
AU               669444        8/1994
(Continued)

OTHER PUBLICATIONS
International Search Report dated May 15, 2009, from corresponding PCT application.

*Primary Examiner* — John Kwon
(74) *Attorney, Agent, or Firm* — Young & Thompson

(57) ABSTRACT

A system for supply of LPG/methane, ammonia, or gas for supply of petrol or diesel engines, which can be connectable to the electronic control unit (8) provided on board the vehicle, the system being equipped with a gas tank (1); a valve (2), a line (3) for delivery of the gas, a rail (6) for supply of the gas to the engine, a pressure and temperature sensor (7); injectors for the petrol (10), and injectors for the gas (11), is characterized in that, to carry out a continuous variation of the pressure of the gas supplied to the injectors (11), it further comprises an electronic pressure regulator and heat exchanger (5) with injector (4), as well as a control unit for deviation and regulation of the pressure (9), which, during operation of the engine with LPG/methane or ammonia or gas, is designed to receive from the electronic control unit of the engine (8) electrical signals as a function of the injection times, the engine r.p.m., and the signal sent by the lambda probe and/or by the rheostat of the accelerator/said electronic control unit for control and regulation of the pressure (9) being further designed to process said signals and send them, at a variable frequency, to the injector (4) of the pressure regulator and heat exchanger (5), which, in this way, is designed to vary continuously and with a constant progression regulation of the pressure of the fuel with which said gas injectors (11) are supplied.

9 Claims, 10 Drawing Sheets

U.S. PATENT DOCUMENTS

| | | | |
|---|---|---|---|
| 4,535,728 A * | 8/1985 | Batchelor | 123/27 GE |
| 5,450,832 A | 9/1995 | Graf | |
| 6,250,260 B1 | 6/2001 | Green | |
| 6,289,881 B1 | 9/2001 | Klopp | |
| 6,474,323 B1 * | 11/2002 | Beck et al. | 123/679 |
| 6,612,272 B2 * | 9/2003 | Kato et al. | 123/41.82 R |
| 2002/0195086 A1 * | 12/2002 | Beck et al. | 123/435 |
| 2007/0246018 A1 | 10/2007 | Farrow et al. | |

FOREIGN PATENT DOCUMENTS

| | | |
|---|---|---|
| AU | 672494 | 8/1994 |
| WO | 92/08886 | 5/1992 |
| WO | 92/08888 | 5/1992 |

* cited by examiner

| ENGINE R.P.M. | | | | | | | | | | | | | | |
|---|---|---|---|---|---|---|---|---|---|---|---|---|---|---|
| Et ms | rpm | 500 | 1000 | 1500 | 2000 | 2500 | 3000 | 3500 | 4000 | 4500 | 5000 | 5500 | 6000 | 6500 |
| TIMES INJECTION PETROL | 1 | 1.0 | 1.0 | | | | | | | | | | | |
| | 2 | 1.0 | 1.0 | | | | | | | | | | | |
| | 3 | 1.0 | 1.0 | | | | | | | | | | | |
| | 4 | | 1.1 | 1.1 | | | | | | | | | | |
| | 5 | | | 1.2 | 1.2 | | | | | | | | | |
| | 6 | | | | 1.3 | 1.3 | | | | | | | | |
| | 7 | | | | | 1.4 | 1.4 | | | | | | | |
| | 8 | | | | | | 1.5 | 1.5 | | | | | | |
| | 9 | | | | | | | 1.6 | 1.6 | | | | | |
| | 10 | | | | | | | | 1.7 | 1.7 | | | | |
| | 11 | | | | | | | | | 1.8 | 1.8 | | | |
| | 12 | | | | | | | | | | 1.9 | 1.9 | | |
| | 13 | | | | | | | | | | | 2.0 | 2.0 | |
| | 14 | | | | | | | | | | | | 2.1 | 2.1 |
| | 15 | | | | | | | | | | | | | 2.2 |
| | 16 | | | | | | | | | | | | | 2.2 |
| | 17 | | | | | | | | | | | | | 2.2 |
| | 18 | | | | | | | | | | | | | 2.2 |
| LPG PRESSURES - GASEOUS PHASE | | | | | | | | | | | | | | |

FIGURE 5

| ENGINE R.P.M. | | | | | | | | | | | | | | |
|---|---|---|---|---|---|---|---|---|---|---|---|---|---|---|
| | rpm | 500 | 1000 | 1500 | 2000 | 2500 | 3000 | 3500 | 4000 | 4500 | 5000 | 5500 | 6000 | 6500 |
| T I M E S   I N J E C T I O N   P E T R O L | 1 | -1.0 | -1.0 | | | | | | | | | | | |
| | 2 | -1.0 | -1.0 | | | | | | | | | | | |
| | 3 | -1.0 | -1.0 | | | | | | | | | | | |
| | 4 | | -0.8 | -0.8 | | | | | | | | | | |
| | 5 | | | -0.6 | -0.6 | | | | | | | | | |
| | 6 | | | | -0.4 | -0.4 | | | | | | | | |
| | 7 | | | | | -0.2 | -0.2 | | | | | | | |
| | 8 | | | | | | 0.0 | 0.0 | | | | | | |
| | 9 | | | | | | | +0.2 | +0.2 | | | | | |
| | 10 | | | | | | | | +0.4 | +0.4 | | | | |
| | 11 | | | | | | | | | +0.6 | +0.6 | | | |
| | 12 | | | | | | | | | | +0.8 | +0.8 | | |
| | 13 | | | | | | | | | | | +1.0 | +1.0 | |
| | 14 | | | | | | | | | | | | +1.2 | +1.2 |
| | 15 | | | | | | | | | | | | | +1.4 |
| | 16 | | | | | | | | | | | | | +1.6 |
| | 17 | | | | | | | | | | | | | +1.8 |
| | 18 | | | | | | | | | | | | | +2.0 |
| VARIATION OF PRESSURE OF LPG/AMMONIA IN THE LIQUID PHASE WITH RESPECT TO PRE-SET PRESSURE | | | | | | | | | | | | | | |

FIGURE 6

| ENGINE R.P.M. | | | | | | | | | | | | | | |
|---|---|---|---|---|---|---|---|---|---|---|---|---|---|---|
| | rpm | 500 | 1000 | 1500 | 2000 | 2500 | 3000 | 3500 | 4000 | 4500 | 5000 | 5500 | 6000 | 6500 |
| Et ms TIMES INJECTION PETROL | 1 | 5.0 | 5.0 | | | | | | | | | | | |
| | 2 | 5.0 | 5.0 | | | | | | | | | | | |
| | 3 | 5.0 | 5.0 | | | | | | | | | | | |
| | 4 | | 5.5 | 5.5 | | | | | | | | | | |
| | 5 | | | 6.0 | 6.0 | | | | | | | | | |
| | 6 | | | | 6.5 | 6.5 | | | | | | | | |
| | 7 | | | | | 7.5 | 7.5 | | | | | | | |
| | 8 | | | | | | 8.0 | 8.0 | | | | | | |
| | 9 | | | | | | | 8.5 | 8.5 | | | | | |
| | 10 | | | | | | | | 9.5 | 9.5 | | | | |
| | 11 | | | | | | | | | 10.0 | 10.0 | | | |
| | 12 | | | | | | | | | | 10.5 | 10.5 | | |
| | 13 | | | | | | | | | | | 11.0 | 11.0 | |
| | 14 | | | | | | | | | | | | 11.5 | 11.5 |
| | 15 | | | | | | | | | | | | | 12.0 |
| | 16 | | | | | | | | | | | | | 12.5 |
| | 17 | | | | | | | | | | | | | 13.0 |
| | 18 | | | | | | | | | | | | | 13.5 |
| METHANE PRESSURES - GASEOUS PHASE ( bar ) | | | | | | | | | | | | | | |

FIGURE 7

| | CCCPRESSURES OF LPG/AMMONIA IN THE LIQUID PHASE | | | | | | | | | | | | |
|---|---|---|---|---|---|---|---|---|---|---|---|---|---|
| | % RICH MIXTURE | | | | | | | % LEAN MIXTURE | | | | | |
| | -35 | -25 | -20 | -15 | -10 | -5 | 0 | +5 | +10 | +15 | +20 | +25 | +35 |
| | INCREASE IN PUMP PRESSURE | | | | | | | | | | | | |
| | bar | bar | bar | bar | bar | bar | bar | bar | bar | bar | bar | bar | bar |
| 6 | 0.3 | 0.4 | 0.5 | 0.6 | 0.7 | 0.8 | 0.9 | 1.0 | 1.1 | 1.2 | 1.3 | 1.4 | 1.5 |
| 6.5 | 0.5 | 0.6 | 0.7 | 0.8 | 0.9 | 1.0 | 1.1 | 1.2 | 1.3 | 1.4 | 1.5 | 1.6 | 1.7 |
| 7 | 0.7 | 0.8 | 0.9 | 1.0 | 1.1 | 1.2 | 1.3 | 1.4 | 1.5 | 1.6 | 1.7 | 1.8 | 1.9 |
| 7.5 | 0.9 | 1.0 | 1.0 | 1.2 | 1.3 | 1.4 | 1.5 | 1.6 | 1.7 | 1.8 | 1.9 | 2.0 | 2.1 |
| 8 | 1.1 | 1.2 | 1.3 | 1.4 | 1.5 | 1.6 | 1.7 | 1.8 | 1.9 | 2.0 | 2.1 | 2.2 | 2.3 |
| 8.5 | 1.3 | 1.4 | 1.5 | 1.6 | 1.7 | 1.8 | 1.9 | 2.0 | 2.1 | 2.2 | 2.3 | 2.4 | 2.5 |
| 9 | 1.5 | 1.6 | 1.7 | 1.8 | 1.9 | 2.0 | 2.1 | 2.2 | 2.3 | 2.4 | 2.5 | 2.6 | 2.7 |
| 9.5 | 1.7 | 1.8 | 1.9 | 2.0 | 2.1 | 2.2 | 2.3 | 2.4 | 2.5 | 2.6 | 2.7 | 2.8 | 2.9 |
| 10 | 1.9 | 2.0 | 2.1 | 2.2 | 2.3 | 2.4 | 2.5 | 2.6 | 2.7 | 2.8 | 2.9 | 3.0 | 3.1 |
| 10.5 | 2.1 | 2.2 | 2.3 | 2.4 | 2.5 | 2.6 | 2.7 | 2.8 | 2.9 | 3.0 | 3.1 | 3.2 | 3.3 |
| 11 | 2.3 | 2.4 | 2.5 | 2.6 | 2.7 | 2.8 | 2.9 | 3.0 | 3.1 | 3.2 | 3.3 | 3.4 | 3.5 |
| 11.5 | 2.5 | 2.6 | 2.7 | 2.8 | 2.9 | 3.0 | 3.1 | 3.2 | 3.3 | 3.4 | 3.5 | 3.6 | 3.7 |
| 12 | 2.7 | 2.8 | 2.9 | 3.0 | 3.1 | 3.2 | 3.3 | 3.4 | 3.5 | 3.6 | 3.7 | 3.8 | 3.9 |
| 12.5 | 2.9 | 3.0 | 3.1 | 3.2 | 3.3 | 3.4 | 3.5 | 3.6 | 3.7 | 3.8 | 3.9 | 4.0 | 4.1 |
| 13 | 3.1 | 3.2 | 3.3 | 3.4 | 3.5 | 3.6 | 3.7 | 3.8 | 3.9 | 4.0 | 4.1 | 4.2 | 4.3 |
| 13.5 | 3.2 | 3.3 | 3.4 | 3.5 | 3.6 | 3.7 | 3.8 | 3.9 | 4.0 | 4.1 | 4.2 | 4.3 | 4.4 |
| | 100 | 95 | 90 | 80 | 70 | 60 | 50 | 40 | 30 | 20 | 10 | 5 | 0 |
| | % OPENING OF PRESSURE-REGULATOR INJECTOR | | | | | | | | | | | | |

FIGURE 8

| PRESSURES OF LPG/AMMONIA IN THE LIQUID PHASE ||||||||||||||
|---|---|---|---|---|---|---|---|---|---|---|---|---|---|
| | % RICH MIXTURE ||||||| % LEAN MIXTURE ||||||
| | -35 | -25 | -20 | -15 | -10 | -5 | 0 | +5 | +10 | +15 | +20 | +25 | +35 |
| | INCREASE IN PUMP PRESSURE ||||||||||||| 
| VOLTS | bar | bar | bar | bar | bar | bar | bar | bar | bar | bar | bar | Bar | bar |
| 6 | 1.8 | | | | | | | | | | | | |
| 6.5 | | 2.0 | | | | | | | | | | | |
| 7 | | | 2.2 | | | | | | | | | | |
| 7.5 | | | | 2.4 | | | | | | | | | |
| 8 | | | | | 2.6 | | | | | | | | |
| 8.5 | | | | | | 2.8 | | | | | | | |
| 9 | | | | | | | 3.0 | | | | | | |
| 9.5 | | | | | | | | 3.2 | | | | | |
| 10 | | | | | | | | | 3.4 | | | | |
| 10.5 | | | | | | | | | | 3.6 | | | |
| 11 | | | | | | | | | | | 3.8 | | |
| 11.5 | | | | | | | | | | | | 4.0 | |
| 12 | | | | | | | | | | | | | 4.2 |
| 12.5 | | | | | | | | | | | | | 4.4 |
| 13 | | | | | | | | | | | | | 4.6 |
| 13.5 | | | | | | | | | | | | | 4.8 |

FIGURE 9

SYSTEM FOR SUPPLY OF LPG, METHANE, AMMONIA, AND GAS IN GENERAL FOR PETROL OR DIESEL ENGINES WITH ELECTRONIC PRESSURE REGULATOR FOR CONTINUOUS VARIATION OF THE PRESSURE OF THE FUEL SUPPLIED TO THE INJECTORS

The present invention relates to systems for supplying gas for petrol or diesel engines, and in particular the system for regulation of the pressure of the supply of gas or other fuel different from petrol or diesel as a function of the amount of fuel required by the engine as the power output and other operating parameters vary.

In current systems for supply with LPG, methane, ammonia, and gas in general, for petrol or diesel engines, both in the gaseous phase and in the liquid phase the fuel is supplied at a pre-set fixed pressure. The amount of fuel required by the engine in the different steps of operation and as a function of the power demand, is varied by means of a purposely provided electronic control unit that acts on the injection times, i.e., on the opening times of the injectors.

This system involves the creation of a mapping of the system and in particular of the electronic control unit for control of the gas, determining a priori, in a pre-set range, the time for which, according to the power demand, the injectors are to remain open to supply the right amount of fuel (LPG, methane, ammonia, and gas in general), necessary for each type of engine.

Normally, for supplying the engine with fuel in the liquid phase, pumps are used that always deliver the fuel at a pre-set fixed pressure, whereas for supplying fuel in the gaseous phase membrane pressure reducers/vaporizers are used.

Examples of said systems are, for instance, known from the international patent No. WO 92/08888, filed in the name of Biocom PTY, which describes a dual-supply system and a method for controlling said system, in which the fuel is injected into the injection pipes through injectors, a set of valves supplies the fuel selected to the injectors through delivery pipes, whilst the excess fuel returns to the tank by means of return pipes. An electronic control unit determines the injection times for the fuel selected according to the engine parameters for the main fuel and with times modified according to the characteristics of the second fuel with respect to the first.

Examples of similar dual-supply systems are moreover known from other patents, such as for example:
U.S. Pat. No. 4,502,453 Kabasin et al.;
AU 669444 The Energy Research and Development Corp.;
PCT AU 91/00532 Biocom PTY Ltd.; and
AU 672 494 The Energy Research and Development Corp.

All the patents cited above and all the systems on the market adapt the amount of fuel required by the engine in the different stages of use by varying the injection times, and supply the necessary pressure to the fuel sent to the engine, as regards supply in the liquid phase, through pumps that provide a pre-set fixed pressure, whereas for supply in the gaseous phase they use membrane pressure reducers/vaporizers.

The systems described and available on the market present certain drawbacks:
they are not very progressive in so far as, with the pump and the mechanical regulation of the pressure at a fixed pressure, when the fuel demand increases, the pressure undergoes drops on account of the delays in intervention of the mechanical pressure regulator, as a result of which the performance of the engine diminishes, whereas, in the case of use of the membrane reducer/vaporizer for supply in the gaseous phase, the responses of supply of the gas occur with a delay because the membrane has to be stimulated to supply the gas;
they do not meet the needs of current electronic-injection supply systems since, by acting with the control unit of the gas on the opening times of the injectors, the mapping performed in an improvised or ad-hoc way cannot satisfy all the infinitesimal variations necessary for proper operation of a modern fuel-injection engine in so far as a small variation of the amount of fuel supplied with respect to the original mapping is sufficient to send the original control unit of the engine into a condition of "protection";
they entail, as has been said, mapping of the electronic control unit of the system so as to optimize carburation for the type of engine supplied in so far as the original control unit of the engine receives signals, amongst other things, from the lambda probe and sends signals to the original "petrol" injectors; during gas operation, the signals are by-passed and sent to resistors for being emulated so as to "hoodwink" the original control unit, and then transmitted to the control unit of the gas, which in turn converts them and sends them to the gas injectors, varying the injection times with opening times that guarantee an acceptable functionality of the gas-fueled engine.

According to the present invention, the drawbacks described are overcome by installing, along the line for supply of the fuel to the engine, a pressure regulator, which is appropriately governed, via an injector, by the electronic control unit.

A peculiar characteristic of the invention lies in the fact that, by keeping the original mapping of the engine unaltered, the electronically controlled pressure regulator varies the pressure of injection of the fuel to the engine progressively and continuously through the management of electric control of the variable-frequency injector, according to the following parameters:
injection times required by the engine in petrol operation;
engine r.p.m.; and
signal sent by the lambda probe or by the rheostat of the accelerator as a result of the pressure exerted on the accelerator pedal by the driver and the speed with which the pedal is pressed.

The invention will now be described in an explanatory and non-limiting embodiment thereof, provided with reference to the attached drawings, where:

FIG. 5 shows a diagram of variation of the pressure of the LPG in the gaseous phase as a function of the engine r.p.m. and the petrol-injection times;

FIG. 6 shows a diagram of variation of the pressure of the LPG/ammonia in the liquid phase as a function of the engine r.p.m. and the petrol-injection times (pressure supplied by the pump=3 bar);

FIG. 7 shows a diagram of variation of the pressure of the methane as a function of the engine r.p.m. and the petrol-injection times;

FIG. 8 shows, purely by way of non-limiting example, the variation of the pressure of the LPG/ammonia in the liquid phase, obtained via the control unit for pressure regulation with the variation of the current of the pump and of the frequency of the injector of the pressure regulator; and FIG. 9 shows, purely by way of non-limiting example, the variation of the pressure of the LPG/ammonia in the liquid phase, obtained via the control unit for pressure regulation with the variation of the current of the pump.

Figure 1A:
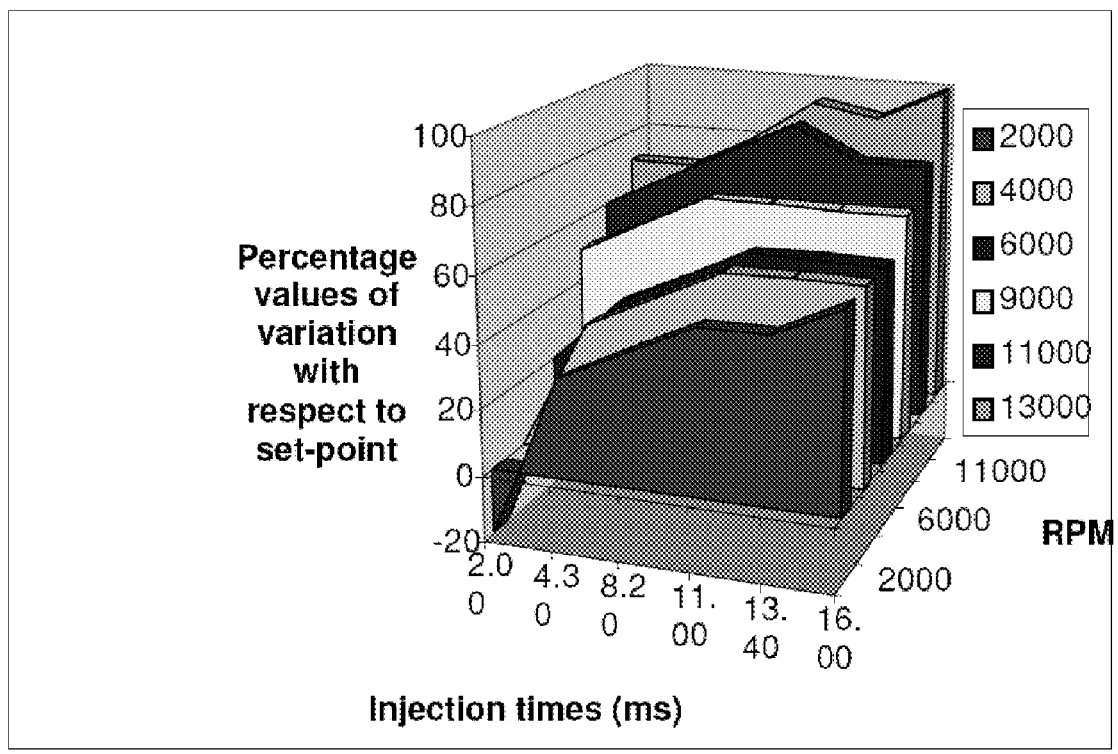
FIG. 1A shows a diagram of the percentage variation of the pressure of the fuel as the parameters sent by the control unit of the engine, i.e., the injection times, and r.p.m., vary.
Figure 1B:
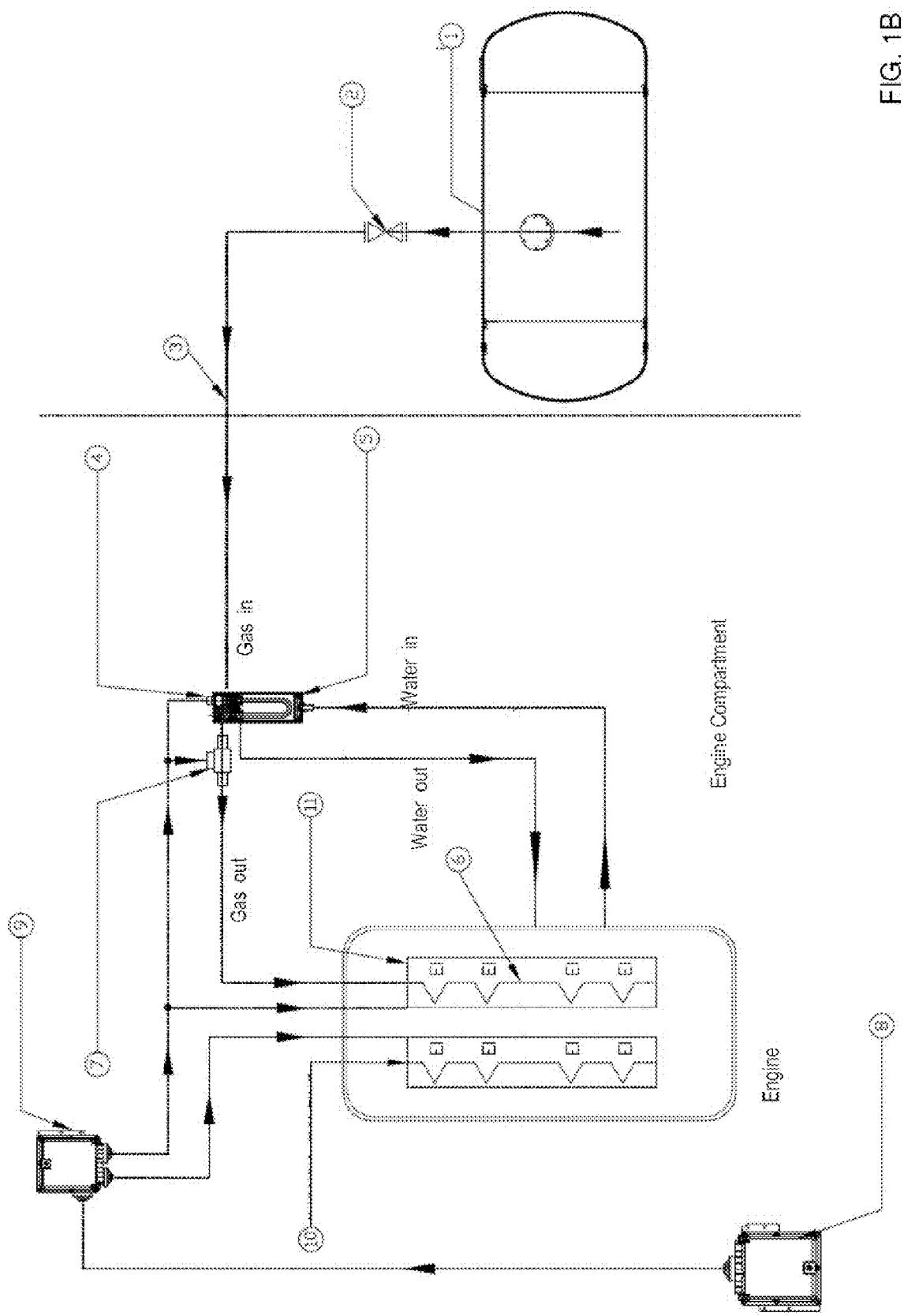
FIG. 1B shows a schematic view of the system, the positioning of the injectors, the pressure regulator with corresponding injector, and the electronic control units for the fuel system functioning with LPG in the gaseous phase.

With reference to FIG. 1B, the system for operation with LPG in the gaseous phase of a petrol engine is constituted by:
- an LPG tank 1;
- a valve 2;
- a line 3 for delivery of the LPG;
- an injector 4;
- a pressure regulator 5 with heat exchanger, in which the hot water coming from the engine circulates;
- a rail 6 for supply of the LPG to the engine;
- a pressure and temperature sensor 7;
- an electronic control unit 8 provided on the vehicle; and
- a control unit for deviation and regulation of the pressure 9 for supply of the petrol injectors 10 or of the gas injectors 11.

The ensemble of the pressure regulator/heat exchanger 5 is constituted by a body, inserted in which are the injector 4 for regulation and vaporization of the gas and the heat exchanger 5, which, thanks to the passage of the hot water coming from the engine, maintains the gas at a temperature higher than freezing point.

During operation, the control unit for deviation and regulation of the pressure 9 receives from the electronic control unit of the engine 8 the electrical signals as a function of the injection times, the engine r.p.m., and the signal sent by the lambda probe and/or by the rheostat of the accelerator; said signals are processed and sent by the electronic control unit for control and regulation of the pressure 9, at a variable frequency, to the injector 4 of the pressure regulator and heat exchanger 5, which varies continuously and with a constant progression the regulation of the pressure of the fuel with which the gas injectors 11 are supplied, thus enabling proper operation of the engine as when it is operating with petrol.

Variation of the pressure occurs in a progressive and continuous way so as to maintain the pressure always adequate for enabling the right amount of fuel necessary for the requirements of the control unit 8 of the vehicle, maintaining the pressure of the fuel in the rail always suited to the need as the demand of the engine varies according to the time and the amount, via opening of the injectors.

The system referred to in the present invention envisages that the control unit for pressure regulation 9, via the electronic pressure regulator, increases or decreases the pressure of the fuel automatically so as to meet the requirements of the engine, simultaneously with the variation of the injection times set by the control unit of the automobile 8 resulting from a lean or rich mixture detected by the lambda probe of the vehicle, or via the signals sent by the rheostat of the accelerator according to the requirements of the driver.

Figure 2:
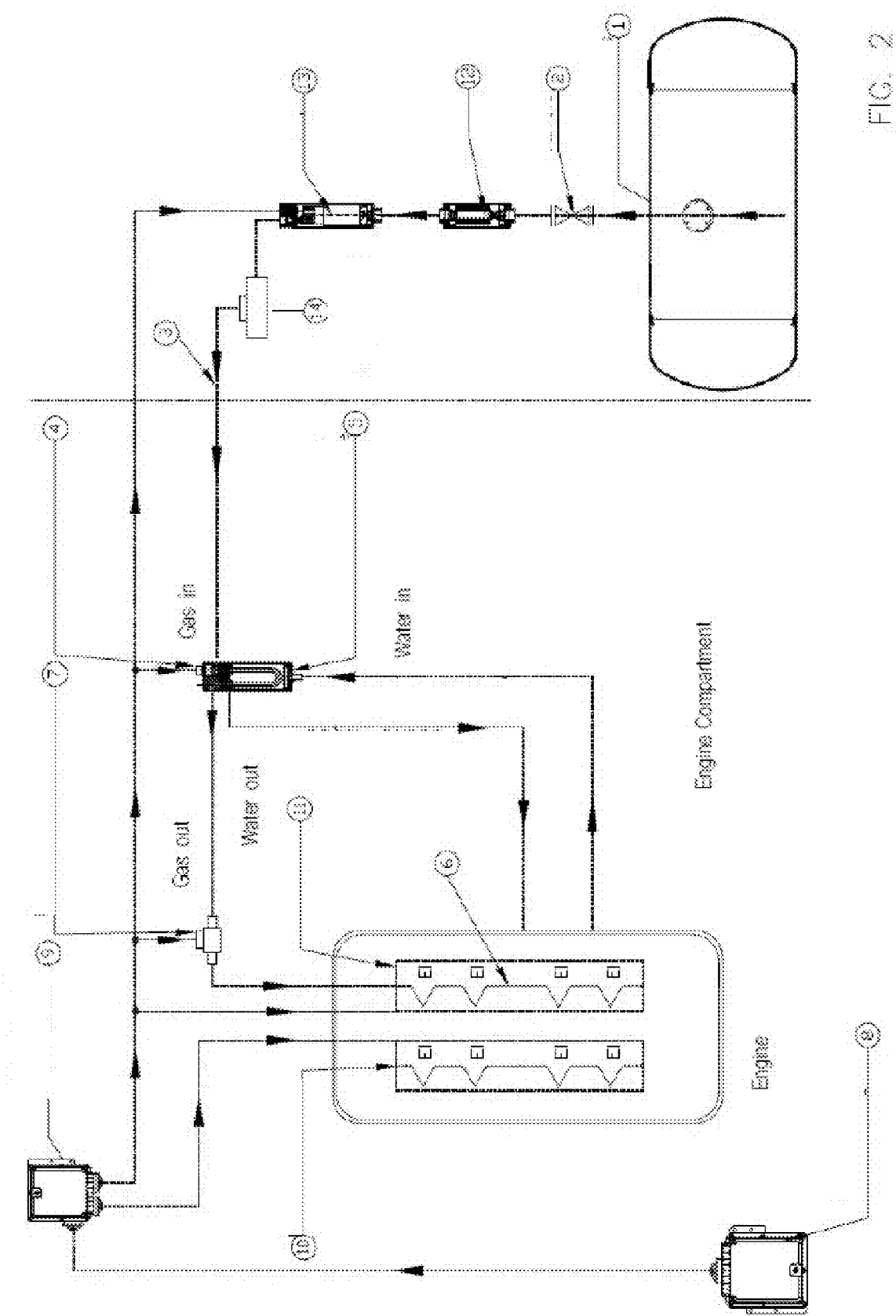
FIG. 2 shows a schematic view of the system, the positioning of the injectors, the pressure reducer, the pressure regulator with corresponding injector, and the electronic control units for the fuel system functioning with LPG in the gaseous phase at a high pressure.

Illustrated in FIG. 2 is the scheme of the system suited to operation of the engine with LPG in the gaseous phase at high pressure. This version, as compared to the system illustrated in FIG. 1, which regards supply of an engine with LPG in the gaseous phase, has been implemented with a filter 12, a pump 13, and a pressure reducer 14, arranged between the valve 2 and the pressure regulator and heat exchanger 5. This version of the system enables activation of the pump via control of the control unit for pressure regulation 9 automatically when the pressure of the gas becomes insufficient, guaranteeing the pressure necessary for proper operation of the engine in particular, but not exclusively, with low external temperatures.

The system of the present invention causes, simultaneously with variation of the injection times of the control unit of the motor vehicle 8 resulting from a lean or rich mixture detected by the lambda probe of the vehicle, the control unit for pressure regulation 9 to increase or decrease the pressure of the fuel automatically so as to meet the requirements of the engine.

Figure 3:
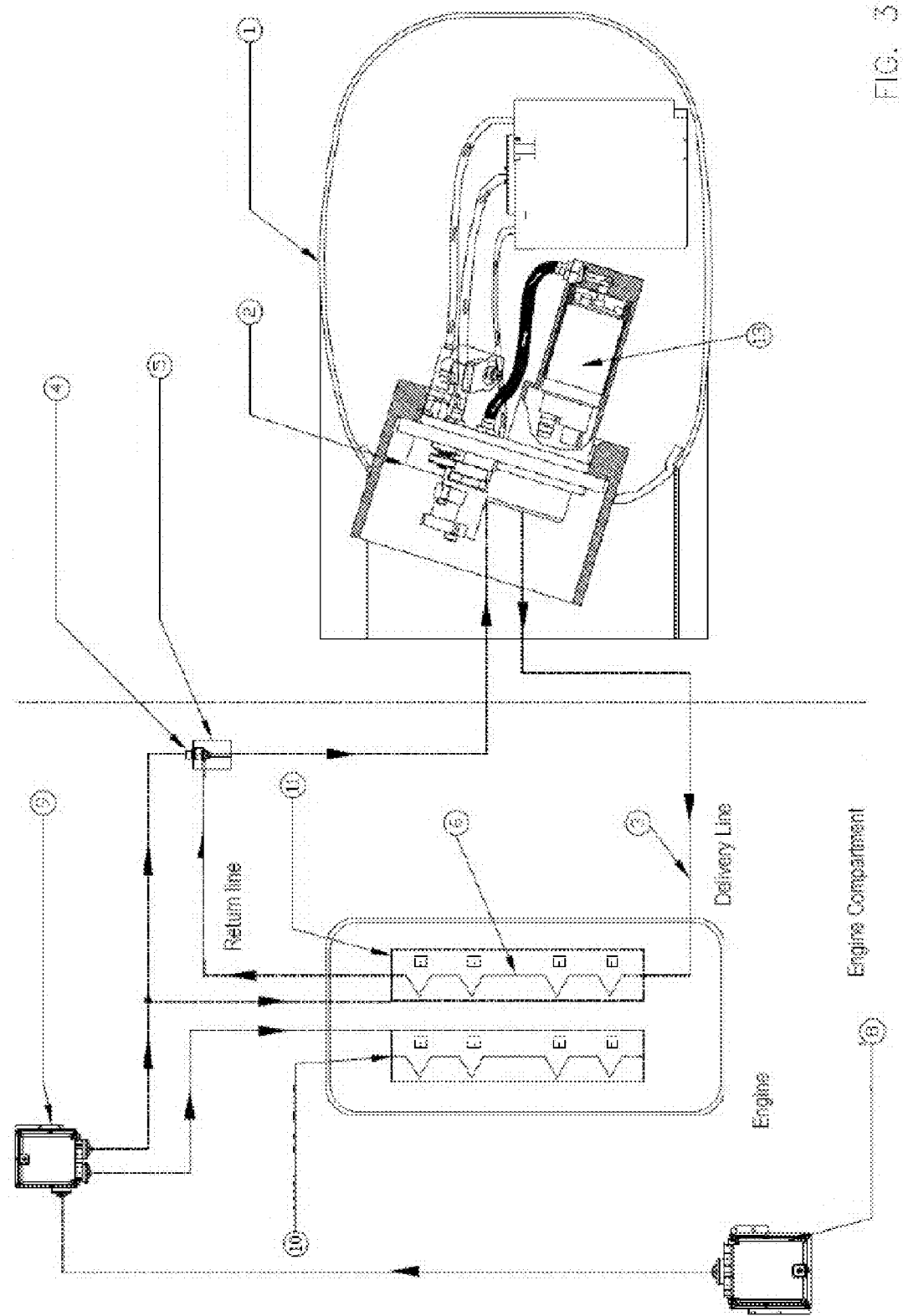
FIG. 3 shows a schematic view of the system, the positioning of the injectors, the pressure regulator with corresponding injector, and the electronic control units for the fuel system functioning with LPG/ammonia in the liquid phase.

In the version suited to operation with LPG or ammonia in the liquid phase (FIG. 3) the system is constituted by:
- a fuel tank 1;
- a fuel pump 13;
- a valve 2;
- a line 3 for delivery of the fuel to the engine;
- an injector 4;
- a pressure regulator 5;
- a rail 6 for supply of the fuel to the engine;
- an electronic control unit 8 provided on the vehicle; and
- a control unit for deviation and regulation of the pressure 9 for supply of the petrol injectors 10 or of the LPG/ammonia injectors 11.

Both the system and its operation in the case of supply with LPG/ammonia in the liquid phase present only minor variations with respect to what is suitable for operation with fuel in the gaseous phase. During operation, the control unit for deviation and regulation of the pressure 9, receives from the original control unit 8, the electrical signals as a function of the injection times, of the engine r.p.m., and of the signals sent by the lambda probe and/or by the rheostat of the accelerator. These signals are processed and sent by the electronic control unit for control and regulation of the pressure 9 at a variable frequency to the injector 4 of the pressure regulator 5, which varies continuously and with a constant progression the regulation of the pressure of the fuel with which the injectors 11 of the LPG/ammonia are supplied, thus enabling a proper operation of the engine altogether similar to that of the engine functioning with petrol.

As in the case of supply of LPG in the gaseous phase, the variation of the pressure via the pressure regulator occurs in a progressive and continuous way so as to maintain the pressure of the fuel always suited to the requirements of the control unit 8 of the vehicle, maintaining the pressure of the fuel in the rail always suited to the need as the demand of the engine varies according to the time and the amount via opening of the injectors. Also in this case, in the presence of lean carburation, the control unit of the motor vehicle 8 extends the injection times. Consequently, the control unit for pressure regulation 9, via the electronic pressure regulator, increases the pressure of the fuel so as conform to the demand of the engine. Instead, if the supply is rich, the control unit of the motor vehicle 8 reduces the injection times, and the control unit for pressure regulation 9, via the electronic pressure regulator, lowers the pressure of the fuel.

According to the present invention, it is advantageously possible to obtain the same result by varying the pressure supplied by the pump. Said variation is made by regulating, once again via the control unit for pressure regulation 9 described herein, the intensity of the current with which the pump itself is supplied.

During operation, the control unit for deviation and regulation of the pressure 9 manages not only the injector 4 of the pressure regulator 5 but also the current of the fuel pump 13 both simultaneously and individually so as to obtain a wide pressure range to be used in the management of the regulation of the fuel according to the requirements of the engine converted to gas.

This offers a further possibility for regulation of the pressure of supply of the fuel to the injectors of LPG/ammonia in the liquid phase, also according to the carburation, and in practice enables a further possibility of increasing or reducing the pressure of supply to the LPG/ammonia injectors after the pressure-regulating injector is already totally open or closed. Said characteristic enables, for example, a high pressure of the LPG/ammonia with which the gas injectors are supplied to be obtained in the event of a sudden demand for power from the engine, for example when overtaking, or reduction of the pressure when the engine is used with minimal loads.

The fuel pump 13, located inside the tank or inside the multivalve flange, is indispensable in the liquid-injection system for guaranteeing circulation of the fuel that must be forced in, because if it is drawn therein could pass into the gaseous phase, creating problems of failure to ignite, and consequent lighting-up of the engine-fault warning light in so far as the fuel injected by an injector for the liquid phase would be insufficient for proper operation of the engine itself.

Figure 4:
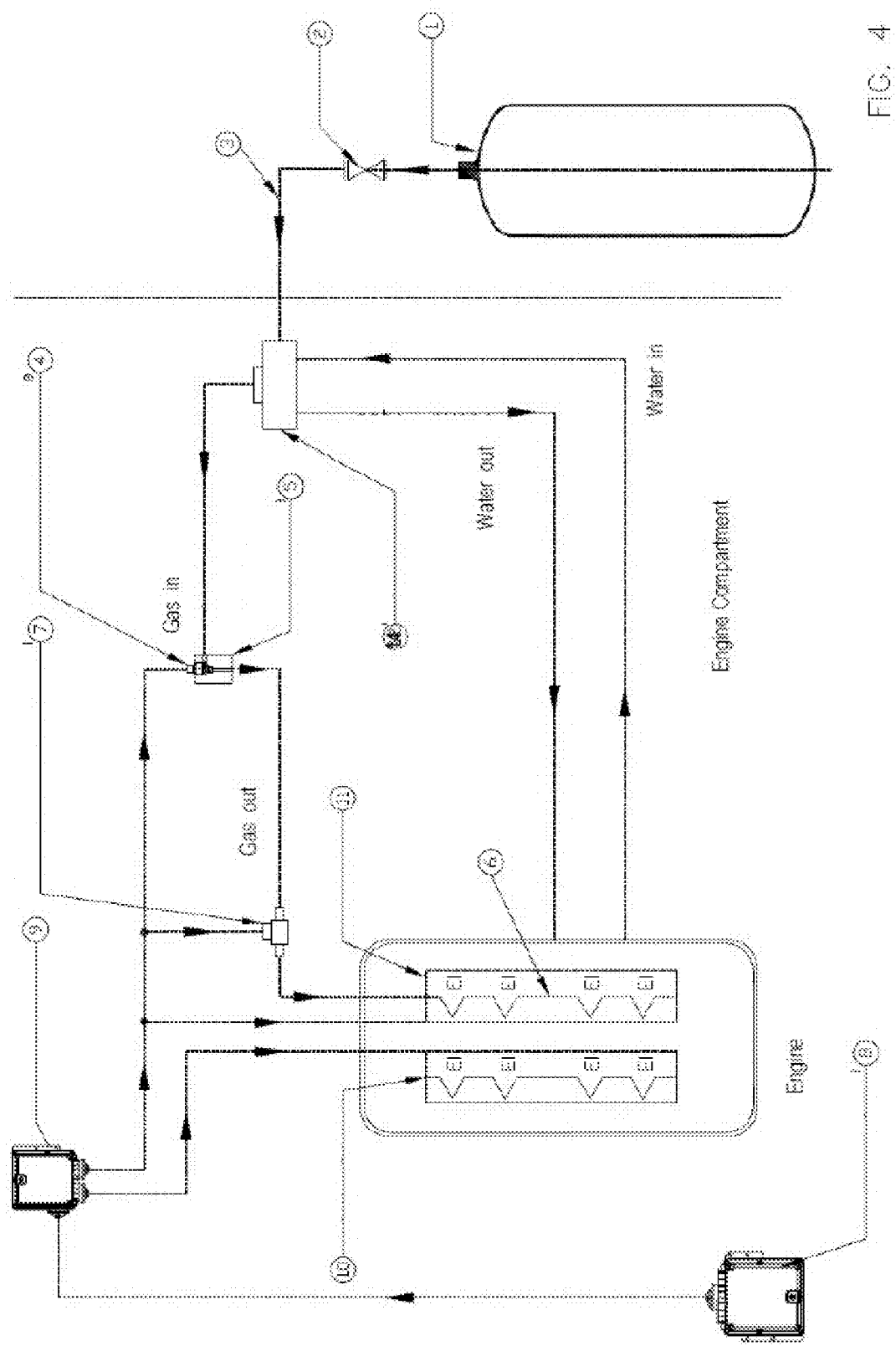
FIG. 4 shows a schematic view of the system, the positioning of the injectors, the pressure reducer, the pressure regulator with corresponding injector, and the electronic control units for the system functioning with methane.

In the case where the engine is supplied with methane, the system illustrated in FIG. 4 is altogether similar to the one illustrated in FIG. 1 and in particular is constituted by:
- a tank for the methane 1;
- a valve 2;
- a line for delivery of the methane 3;
- an injector 4;
- a pressure regulator 5;
- a pressure reducer 12 with heat exchanger, in which the hot water coming from the engine circulates;
- a rail 6 for supply of the methane to the engine;
- a pressure and temperature sensor 7;
- an electronic control unit provided on the vehicle 8; and
- a control unit for deviation and regulation of the pressure 9 for supply of the petrol injectors 10 or of the methane injectors 11.

During operation, the control unit for deviation and regulation of the pressure 9 receives from the original control unit 8 of the engine the electrical signals as a function of the injection times, of the engine r.p.m., and of the signal sent by the lambda probe and/or by the rheostat of the accelerator. Said signals are processed and sent, with a given delay necessary for perfect ignition of the methane, by the control unit for deviation and regulation of the pressure 9 to the injector 4 of the pressure regulator 5 at a variable frequency. The injector 4 receives the methane from the pressure reducer 12 at a pre-set constant pressure, which can, for example, be around 15 bar, varying continuously and with a constant progression the regulation of the pressure of the methane with which the injectors 11 are supplied, thus enabling proper operation of the engine altogether similar to that of the engine functioning with petrol.

Also for supply of the engine with methane, the variation of the pressure occurs in a progressive and continuous way so as to maintain the pressure always suited for enabling the right amount of fuel necessary for the requirements of the control unit 8 of the vehicle, maintaining the pressure of the fuel in the rail always suited to the need as the demand of the engine varies according to the time and the amount of methane via opening of the injectors. Also in this case, in the presence of lean carburation the control unit of the motor vehicle 8 extends the injection times. Consequently, the control unit for pressure regulation 9 increases the pressure of the fuel so as to conform to the demand of the engine. Instead, if the supply is rich, the control unit of the motor vehicle 8 reduces the injection times, and the control unit for pressure regulation 9 lowers the pressure of the fuel.

Illustrated purely way of non-limiting example in FIG. 5 is the variation of the pressure of the LPG with which, through the pressure regulator 5, controlled, as has been said, by the injector 4, the gas injectors 11 are supplied, as the engine r.p.m., the injection times, and hence basically the power demand of the engine, vary. As may be noted, said pressure ranges from 1.0 bar required for 500 r.p.m. to 2.1-2.2 bar for 6,500 r.p.m.

Illustrated purely way of non-limiting example in FIG. 6 is the variation of the pressure produced by the pump of the LPG/ammonia in the liquid phase, with which, via the pressure regulator 5, controlled, as has been said, by the injector 4, the gas injectors 11 are supplied, as the engine r.p.m. and the injection times, and hence basically the power required of the engine, vary. As may be noted, said pressure ranges from −1.0 bar, required for 500 r.p.m. to +2.0 bar for 6,500 r.p.m.

Shown purely by way of non-limiting example in FIG. 7 is the variation in the pressure of the methane with which, through the pressure regulator 5, controlled, as has been said, by the injector 4, the gas injectors 11 are supplied, as the engine r.p.m., the injection times, and hence basically the power required of the engine, vary. As may be noted, said pressure ranges from 5.0 bar required for 500 r.p.m. to 13.5 bar for 6,500 r.p.m.

Shown purely by way of non-limiting example in FIG. 8 is the variation of the pressure of the LPG/ammonia in the liquid phase, obtained via the control unit for pressure regulation 9 with the variation of the current of the pump 13 and the frequency of the injector 4 of the pressure regulator 5, with which the gas injectors 11 are supplied, as the engine r.p.m., the injection times, and/or the signals of the rheostat of the accelerator vary, and as a result of the rich or lean mixture, and hence basically as the power required of the engine varies. As may be noted, said increase/decrease in pressure ranges from 0.3 bar to 4.4 bar.

Illustrated purely by way of non-limiting example in FIG. 9 is the variation of the pressure of the LPG/ammonia in the liquid phase, obtained via the control unit for pressure regulation 9 with the variation of the current of the pump 13, with which the gas injectors 11 are supplied, as the engine r.p.m., the injection times, and/or the signals of the rheostat of the accelerator vary, and as a result the rich or lean mixture, hence basically as the power required of the engine varies. As may be noted, said increase/decrease in pressure ranges from 1.8 bar to 4.8 bar.

The invention claimed is:

1. A system for supplying LPG/methane, ammonia, or gas as an injection fuel for a petrol or diesel engine having an electronic control unit, said system comprising:
- a fuel tank configured to contain LPG/methane, ammonia, or gas as the fuel;
- a line for delivery the fuel from the fuel tank;
- a valve controlling flow of fuel from the fuel tank to the line for delivery;
- injectors for the petrol;
- injectors for the fuel;
- a rail receiving the supply of the fuel from the line for deliver to the injectors for the fuel;

a pressure and temperature sensor positioned between the fuel tank and the injectors for the fuel;

an electronic pressure regulator and heat exchanger with an injector being positioned between the fuel tank and the injectors for the fuel; and an electronic control unit for deviation and regulation of the pressure being operatively associated with the injector of the pressure regulator and heat exchanger and configured to be operatively associated with the electronic control unit of the engine, wherein said electronic control unit for deviation and regulation of the pressure receives from the electronic control unit of the engine electrical signals as a function of injection times, engine r.p.m., and a signal sent by at least one of a lambda probe and a rheostat of the accelerator of said vehicle, and wherein said electronic control unit for control and regulation of the pressure processes said signals and sends signals, at a variable frequency, to the injector of the pressure regulator and heat exchanger so that fuel pressure with which said injectors for the fuel are supplied varies continuously and with a constant progression regulation.

2. The system according to claim 1, wherein said electronic pressure regulator and heat exchanger with an injector comprises:

a pressure regulator body into which the injector is inserted, the injector is configured for regulation and vaporization of a gas, and a heat exchanger configured to maintain the gas at a temperature higher than freezing point by using to hot water coming from the engine.

3. The system according to claim 1, wherein said electronic pressure regulator and heat exchanger with an injector is configured to vary pressure of injection of the fuel to the injectors for fuel continuously and progressively as a function of injection times provided by the electronic control unit of the vehicle, the engine r.p.m., and the signal sent by at least one of the lambda probe and by the rheostat of the accelerator.

4. The system according to claim 1, wherein the system further comprises a pressure reducer with a heat exchanger, said pressure reducer with the heat exchanger is operationally associated with the injector of the pressure regulator and heat exchanger so that the system is configured to supply methane as the fuel with a constant average pressure to the injector of the pressure regulator and heat exchanger.

5. The system according to claim 1, wherein the system further comprises a fuel pump configured to supply LPG/ammonia in the liquid phase as the fuel from the fuel tank, said fuel pump is equipped with means for regulating current supply controlled by the electronic control unit for deviation and regulation of the pressure so that by increasing or decreasing the current supply of fuel pump via the electronic control unit for deviation and regulation of the pressure, higher or more modest pressures in the injection of the fuel are obtained and the pressure of the fuel is adapted according to the requirements of the electronic control unit of the vehicle, automatically regulating the amount of fuel sent to the injectors for the fuel.

6. The system according to claim 1, further comprising a filter, a pump, and a pressure reducer as components configured for supplying fuel in a gaseous state at high pressure to the line of delivery, said components being arranged between the valve and the pressure regulator and heat exchanger with the injector, said components being configured to increase automatically via control of said electronic control unit for deviation and regulation of the pressure so that injection at a high pressure is guaranteed.

7. The system according to claim 1, wherein said electronic control unit for deviation and regulation of the pressure is operationally associated with the injectors to vary the pressure of the fuel supplied to the injectors for the fuel automatically to adapt an amount of LPG/ammonia in the liquid phase supplied as the fuel at the injection times set by the original mapping of the engine.

8. The system according to claim 1, wherein said electronic control unit for deviation and regulation of the pressure is operationally associated with the injectors so that the injectors without any delay can force LPG/ammonia in the liquid phase as the fuel into the engine.

9. The system according to claim 1, wherein said electronic control unit for deviation and regulation of the pressure is operationally associated with (i) the injector of the pressure regulator and heat exchanger and (ii) the current of the fuel pump so as to obtain a wide range of pressure to be used in managing regulation of the fuel as LPG/ammonia in the liquid phase according to the requirements of the engine during opeartion.

* * * * *